(12) United States Patent
Deng et al.

(10) Patent No.: US 10,333,131 B2
(45) Date of Patent: Jun. 25, 2019

(54) COVER ASSEMBLY AND BATTERY COMPRISING THE SAME

(71) Applicants: SHENZHEN BYD AUTO R&D COMPANY LIMITED, Shenzhen (CN); BYD COMPANY LIMITED, Shenzhen, Guangdong (CN)

(72) Inventors: Qisi Deng, Guangdong (CN); Lujian Wang, Guangdong (CN); Yuchen He, Guangdong (CN); Qiang Wu, Guangdong (CN)

(73) Assignees: BYD COMPANY LIMITED, Shenzhen (CN); SHENZHEN BYD AUTO R&D COMPANY LIMITED, Shenzhen (CN)

( * ) Notice: Subject to any disclaimer, the term of this patent is extended or adjusted under 35 U.S.C. 154(b) by 585 days.

(21) Appl. No.: 14/137,696

(22) Filed: Dec. 20, 2013

(65) Prior Publication Data
US 2014/0106210 A1 Apr. 17, 2014

Related U.S. Application Data

(63) Continuation of application No. PCT/CN2012/077667, filed on Jun. 27, 2012.

(30) Foreign Application Priority Data

Jun. 28, 2011 (CN) .......................... 2011 1 0175937
Apr. 20, 2012 (CN) .......................... 2012 1 0117690

(51) Int. Cl.
*H01M 2/30* (2006.01)
*H01M 2/06* (2006.01)
(Continued)

(52) U.S. Cl.
CPC .......... *H01M 2/30* (2013.01); *H01M 2/0456* (2013.01); *H01M 2/065* (2013.01); *H01M 2/043* (2013.01); *H01M 2/0404* (2013.01); *H01M 2/08* (2013.01)

(58) Field of Classification Search
CPC .......... H01M 2/08; H01M 2/065; H01M 2/30; H01M 2/32
See application file for complete search history.

(56) References Cited

U.S. PATENT DOCUMENTS 3,840,408 A 10/1974 Bondley
4,337,302 A 6/1982 Takizawa
(Continued)

FOREIGN PATENT DOCUMENTS

CN 2833898 Y 11/2006
CN 2865003 Y 1/2007
(Continued)

OTHER PUBLICATIONS

PCT International Search Report dated Oct. 4, 2012, issued in International Application No. PCT/CN2012/077667 (4 pages).

*Primary Examiner* — Ula C Ruddock
*Assistant Examiner* — Thomas H. Parsons
(74) *Attorney, Agent, or Firm* — Anova Law Group, PLLC (57) ABSTRACT

A cover assembly and a battery comprising the same are provided. The cover assembly comprises: a cover plate body formed with at least a via hole penetrating therethrough; a cover plate connecting member hermetically connected with the cover plate body at the via hole, which is formed with an electrode receiving hole therein; and an electrode terminal penetrating through the electrode receiving hole to be hermetically connected with and insulated from the cover plate connecting member for leading out a current.

20 Claims, 4 Drawing Sheets

(51) Int. Cl.
*H01M 2/04* (2006.01)
*H01M 2/08* (2006.01)

(56) References Cited

U.S. PATENT DOCUMENTS

| | | | |
|---|---|---|---|
| 4,904,551 A | 2/1990 | Denoncourt et al. | |
| 6,268,079 B1* | 7/2001 | Inoue | H01M 2/065 |
| | | | 429/171 |
| 6,335,117 B1 | 1/2002 | Yoshida et al. | |
| 7,892,674 B2 | 2/2011 | Takami et al. | |
| 2003/0143460 A1 | 7/2003 | Yoshida et al. | |
| 2006/0175071 A1* | 8/2006 | Knappen | A61N 1/3754 |
| | | | 174/50.56 |
| 2009/0061307 A1* | 3/2009 | Uh | H01M 2/0404 |
| | | | 429/178 |

FOREIGN PATENT DOCUMENTS

| | | |
|---|---|---|
| JP | 58-117064 U | 8/1983 |
| JP | 58-118655 U | 8/1983 |
| JP | 2000-58031 A | 2/2000 |
| JP | 2000-164198 A | 6/2000 |
| JP | 2003-223875 A | 8/2003 |
| KR | 10-2002-0093181 A | 12/2002 |
| WO | WO 2013/000414 A1 | 1/2013 |

\* cited by examiner

COVER ASSEMBLY AND BATTERY COMPRISING THE SAME

CROSS-REFERENCE TO RELATED APPLICATIONS

This application is a continuation application of International Application No. PCT/CN2012/077667, filed on Jun. 27, 2012, which claims priority to and benefits of the following applications:

1) Chinese Patent Application Serial No. 201110175937.9, filed with the State Intellectual Property Office of P. R. China on Jun. 28, 2011; and 2) Chinese Patent Application Serial No. 201210117690.X, filed with the State Intellectual Property Office of P. R. China on Apr. 20, 2012.

The entire contents of the above applications are incorporated herein by reference.

FIELD

The present disclosure relates to a battery field, and more particularly to an improved cover assembly and a battery having the improved cover assembly.

BACKGROUND

A lithium ion battery is an ideal power source for a modern vehicle because of advantages of non-pollution, low cost, high capacity, long cycle of life, etc. The lithium ion battery may be formed by winding or stacking a positive plate, a separator and a negative plate sequentially to form an electric core, placing the electric core in a chamber formed by a shell and a cover plate, injecting an electrolyte in the chamber, and sealing an opening end of the shell, followed by formation. In the lithium ion battery, the cover plate is important to ensure the sealing of the shell. Whether the sealing of the shell is good may affect the safety, the aging resistance and the insulating performance of the lithium ion battery. In addition, the cover plate may account for a certain proportion of the total cost of the lithium ion battery. Production efficiency and yield of the cover plate may be enhanced to reduce the cost of the battery.

Currently, the sealing and insulation of the lithium ion battery is mainly realized by injection molding a plastic. A ceramic sealing member is also used for insulating and sealing the cover plate. The cover plate is welded with the ceramic sealing member, a positive leading-out pole and a negative leading-out pole are welded with the ceramic sealing member respectively, and the cover plate is insulated and sealed. However, the temperature at which the cover plate is welded with the ceramic sealing member is high, which may affect the material of the cover plate. Under the high temperature, the cover plate may become soft and have low strength and low production efficiency. Moreover, the cover plate is formed with various mounting members. The deformation of the cover plate may affect the performance thereof largely, especially affect the subsequent hermetical connection between the cover plate and the shell, thus increasing the difficulty of manufacturing a cover assembly to fit with the shell, reducing the yield of the battery, and affecting the practical application and the development of the battery.

SUMMARY

Embodiments of the present disclosure seek to solve at least one of the problems existing in the art to at least some extent. In some embodiments, a cover assembly is provided, which is easy to manufacture and easy to produce at a large scale. Moreover, during the manufacturing, the cover assembly does not deform whereas the yield of the cover assembly is high. Furthermore, a battery comprising the cover assembly is provided.

According to a first aspect of the present disclosure, a cover assembly may be provided. The cover assembly may comprise: a cover plate body formed with at least a via hole penetrating therethrough; a cover plate connecting member hermetically connected with the cover plate body at the via hole, which is formed with an electrode receiving hole therein; and an electrode terminal penetrating through the electrode receiving hole to be hermetically connected with and insulated from the cover plate connecting member for leading out a current.

According to a second aspect of the present disclosure, a battery may be provided. The battery may comprise: a shell having at least an opening end; a cover assembly according to the first aspect of the present disclosure for sealing the opening end; and an electric core and an electrolyte which are received in a sealed space formed by the shell and the cover assembly, in which the electrode terminal is electrically connected with the electric core.

With the cover assembly according to an embodiment of the present disclosure, after the electrode terminal is hermetically connected with and insulated from the cover plate connecting member, the electrode terminal is connected with the cover plate body via the cover plate connecting member. Because the cover plate connecting member may be a small member, during the high-temperature welding between the cover plate connecting member and the ceramic sealing member, the cover plate connecting member may not deform or have minimum deformation. The cover plate connecting member after sintered may be washed. Then, the cover plate connecting member is welded with the cover plate body. The main function of the cover plate connecting member is to hermetically connect the ceramic sealing member, the electrode terminal and the cover plate body together, so there are no limitations on the shape of the cover plate connecting member. Moreover, the cover plate connecting member may have small bulk, but may not be special parts. Furthermore, the cover plate connecting member may sustain a high temperature. At a high temperature, the deformation of the cover plate connecting member may be small, which may not affect the sealing of the battery; and the cover plate connecting member made of a material identical with that of the cover plate body is welded with the cover plate body, which may be easily achieved without influence on the strength of the cover plate body. With the cover assembly according to an embodiment of the present disclosure, the manufacturing cost may be reduced, especially the battery yield may be enhanced. In addition, the battery safety may be improved, the connection of the structure of the cover assembly is stable, and the cover assembly has good sealing performance, thus laying the foundation for practical application and development of a ceramic sealed battery.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the description, unless specified or limited otherwise, it is to be understood that phraseology and terminology used herein with reference to device or element orientation (for example, terms like "upper", "lower", and the like) should be construed to refer to the orientation as then described or as shown in the drawings under discussion for simplifying the description of the present disclosure, but do not alone indicate or imply that the device or element referred to must have a particular orientation. Moreover, it is not required that the present disclosure is constructed or operated in a particular orientation.

The cover assembly according to an embodiment of the present disclosure is used for sealing a battery, and mainly used for sealing a lithium ion battery, especially a high-power lithium ion battery such as a lithium ion power battery or a lithium ion storage battery. As known to those skilled in the art that, the lithium ion battery mainly comprises a shell having at least an opening end, an electric core placed in the shell, and an electrolyte received in the shell. To avoid electrolyte leakage, a cover assembly is used to seal the opening end of the shell. The shell may be made from aluminum or steel for receiving the electric core and the electrolyte. There may be one opening end. In this embodiment, one end of the shell is opened for leading out a current from one end of the lithium ion battery. Alternatively, there may be two opening ends. In this embodiment, two ends of the shell are opened for leading out currents from two ends of the lithium ion battery respectively. It should be noted that, in the following, there are no limitations on the number and/or position of the opening end(s). The opening end may be formed at a short side of the shell, and the electric core is directly placed in the shell vertically. An end of the electric core for leading out a current is exposed from the opening end. The opening end may also be formed at a long side of the shell, and the electric core is directly placed in the shell horizontally. A wound circular arc edge portion of the electric core may be exposed from the opening end. The electric core is formed by stacking or winding a positive plate, a separator and a negative plate sequentially. The structure of the electric core and the process for preparing the same may be achieved by conventional arts, so a detailed description thereof will be omitted here.

The cover assembly according to an embodiment of the present disclosure will be described below in detail with reference to the accompanying figures.

Figure 3:
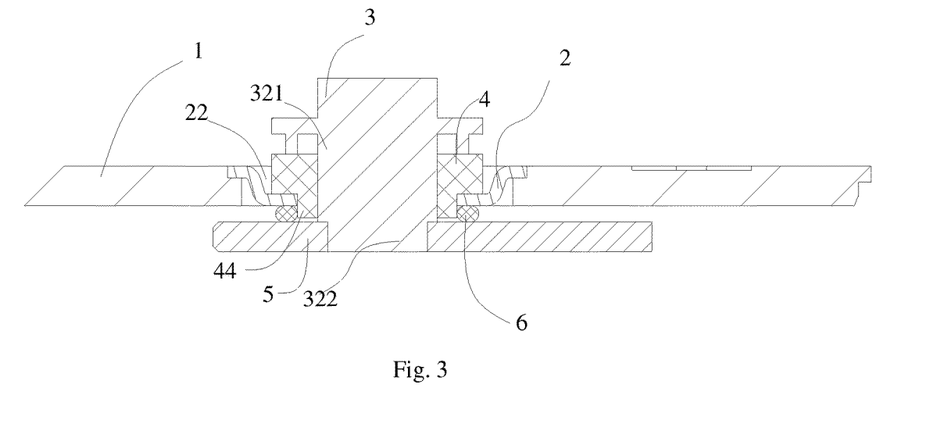
FIG. 3 is a schematic sectional view of a cover assembly with an electrode connecting piece being connected according to an embodiment of the present disclosure.

As shown in FIG. 3, the cover assembly of the present disclosure comprises a cover plate body 1, a cover plate connecting member 2 and an electrode terminal 3.

Figure 2:
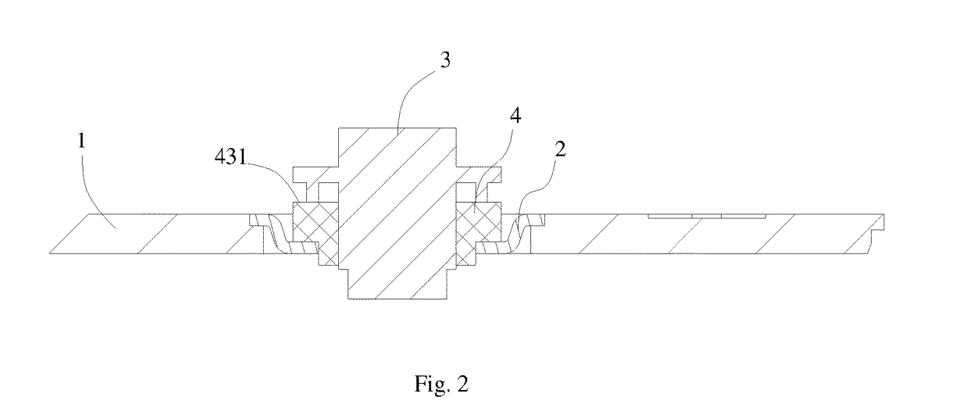
FIG. 2 is a schematic sectional view of a cover assembly according to an embodiment of the present disclosure.
Figure 7:
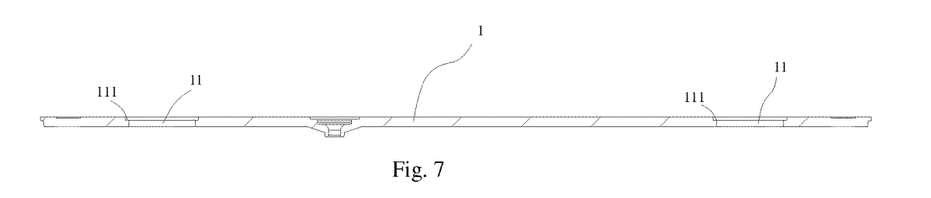
FIG. 7 is a sectional view of a cover plate body according to an embodiment of the present disclosure.
Figure 8:
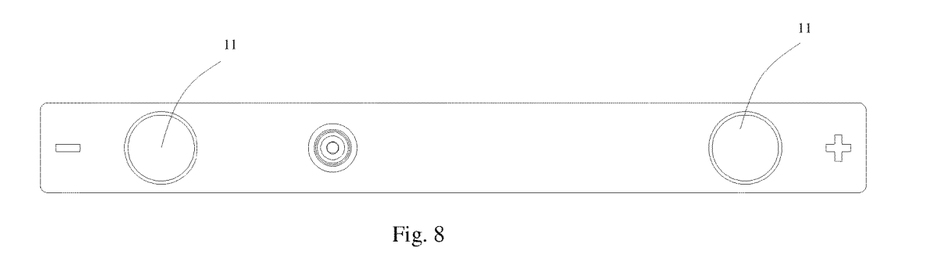
FIG. 8 is a top view of a cover plate body according to an embodiment of the present disclosure.

As shown in FIGS. 2, 7-8, the cover plate body 1 is used for sealing the shell. The cover plate body 1 is formed with at least a via hole 11 penetrating through the cover plate body 1 for leading out a current inside the battery. There are no limitations on the number of the via holes 11, which may be determined according to the number of the electrode terminals 3 for leading out currents. In some embodiments, a plurality of via holes 11 are formed in the cover plate body 1, and there are a plurality of cover plate connecting members 2 each hermetically connected with the cover plate body 1 at a corresponding via hole 11. For example, when the current is led out from one end of the battery, the cover plate body 1 may be formed with one via hole 11, through which an electrode terminal 3 with one polarity penetrates. At this time, an electrode terminal 3 with the other polarity, for example, a tab, may be connected with the shell for leading out a current, and the electrode terminal 3 penetrating through the cover plate body 1 needs to be subjected to an insulation treatment. The cover plate body 1 may also be formed with a plurality of via holes 11, through which electrode terminals 3 with the same polarity or different polarities penetrates respectively. When electrode terminals 3 with different polarities penetrates through the plurality of via holes 11 respectively, only the electrode terminals 3 with one polarity may be subjected to the insulation treatment, or the electrode terminals 3 and the cover plate body 1 are all subjected to the insulation treatment. The via hole 11 can have any suitable shape that allows the electrode terminal 3 to penetrate through. For example, the via hole 11 may be of a cylindrical shape, penetrating through the cover plate body 1 and having a diameter slightly larger than that of the electrode terminal 3. In one embodiment, the via hole 11 is configured as a stepped hole for engaging and mounting the cover plate connecting member 2. There are no limitations on the number of the cover plate bodies 1, which may be determined according to the number of the opening ends of the shell. The shape of the cover plate body 1 may be designed according to the opening end of the shell for matching with the shell. For example, the cover plate body 1 may have a circular or square shape. The cover plate body 1 may have a thickness of, for example, about 1.5 mm or about 2.0 mm. The material of the cover plate body 1 may be selected from aluminum alloy 3003 or pure aluminum, or other suitable materials. Other structures on the cover plate body 1, for example, a liquid injecting port, and the manufacturing methods thereof may be easily achieved in the art, so a detailed description thereof will be omitted here.

Figure 1:
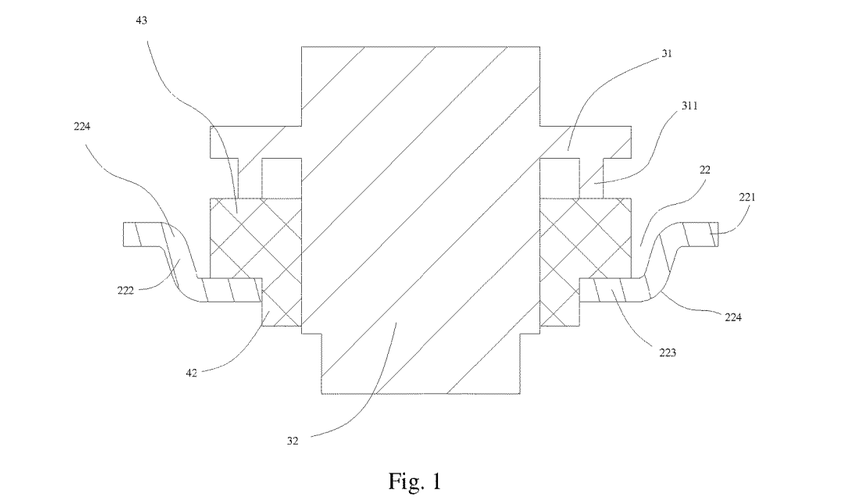
FIG. 1 is a schematic sectional view of a cover assembly according to an embodiment of the present disclosure.

As shown in FIGS. 1-4, the cover plate connecting member 2 is formed with an electrode receiving hole 21 penetrating through the cover plate connecting member 2, and the electrode terminal 3 penetrates through the electrode receiving hole 21 to be hermetically connected with and insulated from the cover plate connecting member 2 for leading out a current. The cover plate connecting member 2 is hermetically connected with the cover plate body 1 at the via hole 11. In one embodiment, a ceramic sealing member 4, the electrode terminal 3 and the cover plate body 1 are hermetically connected with each other. For example, the electrode terminal 3, the ceramic sealing member 4 and the cover plate connecting member 2 are first made into an integral structure, and then the cover plate connecting member 2 is welded with the cover plate body 1, thus achieving the insulation and the sealing of the cover assembly. The cover plate connecting member 2 is normally a small member. There are no limitations on the shape, structure or disposition of the cover plate connecting member 2. For example, the cover plate connecting member 2 may be disposed on an upper or lower surface of the cover plate body 1. The cover plate connecting member 2 may have, for example, an arcuate shape. The integral structure formed by the electrode terminal 3, the ceramic sealing member 4 and the cover plate connecting member 2 is connected with the cover plate body 1. When the electrode terminal 3 penetrates through the via hole 11 in the cover plate body 1, an insulation sealing member is further sandwiched between the electrode terminal 3 and the cover plate body 1. In order to enhance the stability of the connection and simplify the process, in one embodiment, the cover plate connecting member 2 is disposed in the via hole 11 in the cover plate body 1, thus facilitating the sealing and the connection of the cover assembly. In order to facilitate the mounting of the electrode terminal 3, in one embodiment, the cover plate connecting member 2 comprises a mounting groove 22, and the electrode receiving hole 21 penetrates through a bottom 223 of the mounting groove 22. In one embodiment, a flanging portion 221 is formed at a periphery of the mounting groove 22. The flanging portion 221 is connected with the cover plate body 1, thus facilitating the welding, avoiding the influence of a minor dimension change of the ceramic sealing member 4 during the high-temperature welding on the sealing performance of the cover assembly, thus enhancing the sealing performance of the cover assembly, simplifying the manufacturing process, and enhancing the battery yield without considering the size error of the cover plate connecting member 2. In one embodiment, the via hole 11 may be configured as a stepped hole, and the flanging portion 221 is disposed on a step portion 111 of the stepped hole and stationarily connected with the cover plate body 1. That is, the flanging portion 221 is engaged with the cover plate body 1 at the step portion 111, thus further enhancing the stability of the connection. The thickness of the flanging portion 221 may be configured to compensate for the cutout portion of the cover plate body 1 on the step portion 111 of the stepped hole. The cover plate connecting member 2 and the cover plate body 1 may be formed into an integral structure, thus enhancing the reliability of the connection between the cover plate connecting member 2 and the cover plate body 1 and ensuring that the surface of the cover plate body 1 is smooth. The inner diameter of the stepped hole is normally larger than the inner diameter of the mounting groove 22 for placing the mounting groove 22 conveniently, and is smaller than the outer diameter of the entire mounting groove 22 having the flanging portion 221; and the outer diameter of the stepped hole is larger than the outer diameter of the entire mounting groove 22 having the flanging portion 221, so that the cover plate connecting member 2 may be engaged with the cover plate body 1 at the step portion 111 of the stepped via hole 11. The height of the cover plate connecting member 2 may be smaller than the thickness of the cover plate body 1. In one embodiment, the height of the cover plate connecting member 2 may be equal to the thickness of the cover plate body 1. In one embodiment, there is a smooth transition portion 224 connected between a side wall 222 of the mounting groove 22 and the bottom portion of the mounting groove 22 as shown in FIG. 1; and there is a smooth transition portion connected between the side wall 222 of the mounting groove 22 and the flanging portion 221 as shown in FIG. 1, thus ensuring buffering and reduction of the mechanical stress in time during assembly, enhancing the flexural strength of the cover assembly, and ensuring good sealing performance of the cover assembly. The side wall 222 of the mounting groove 22 may also reduce the stress produced when the cover plate connecting member 2 is welded with the ceramic sealing member 4. The cover plate connecting member 2 may be commercially available, and may also be manufactured by integrally forming thin metal sheets. For example, the cover plate connecting member 2 may have a thickness of about 0.8 mm and a predetermined toughness to facilitate the welding.

Figure 4:
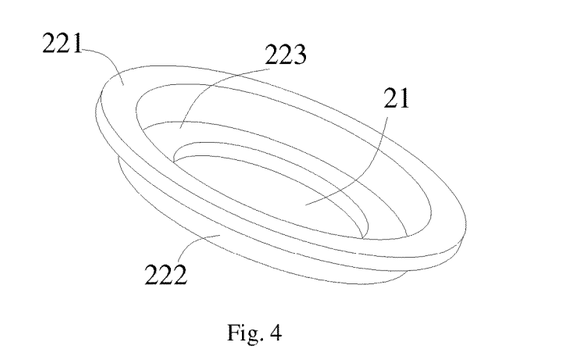
FIG. 4 is a perspective view of a cover plate connecting member according to an embodiment of the present disclosure.

In some embodiments, the number of the electrode receiving holes 21 may be determined according to the number of the electrode terminals 3. In some embodiments, there are a plurality of electrode terminals 3, and a plurality of electrode receiving holes 21 corresponding to the electrode terminals 3 are formed in the cover plate connecting member 2. For example, in one embodiment, one large cover plate connecting member 2 may be disposed in the via hole 11 in the cover plate body 1. Electrode receiving holes 21, the number of which is identical with that of the electrode terminals 3, may be formed in the cover plate connecting member 2. Each electrode terminal 3 penetrates through a corresponding electrode receiving hole 21 for leading out a current, and an insulation sealing member may be disposed between the cover plate connecting member 2 and the electrode terminal 3 as required. The number of the cover plate connecting members 2 may also be determined according to the number of the electrode terminals 3. Each of the cover plate connecting members 2 may be formed with one electrode receiving hole 21, or alternatively the number of the electrode receiving holes 21 in each of the plurality of cover plate connecting members 2 may be different from each other.

The material of the cover plate connecting member 2 may be the same as that of the cover plate body 1. For example, the material of the cover plate connecting member 2 may be aluminum alloy 3003 or pure aluminum, thus further facilitating the welding of the cover assembly and ensuring the strength of the cover assembly.

The electrode terminal 3 is electrically connected with the electric core for leading out a current from the battery. There are no limitations on the number or shape of the electrode terminals 3, which may be determined according to the magnitude of the current to be led out. For a small-volume battery, the electrode terminal 3 may be a tab provided on the electric core (not shown). In one embodiment, the electrode terminal 3 may be a metal conductive member connected with the tab, for example, a sheet-like electrode terminal or pole. The sheet-like electrode terminal or pole may be welded with the tab of the electric core to achieve electrical conduction between the electric core and the sheet-like electrode terminal or pole. Alternatively, the sheet-like electrode terminal or pole may be connected with a connecting piece, and the connecting piece is welded with the tab of the electric core to achieve electrical conduction between the electric core and the sheet-like electrode terminal or pole.

As shown in FIGS. 1-3 and 5, in one embodiment, the electrode terminal 3 comprises a terminal pole portion 32 and a pole cap portion 31. The pole cap portion 31 and the terminal pole portion 32 may be integrally formed, and may also be connected with each other by welding or cold heading. For a positive electrode terminal, the materials of the pole cap portion 31 and the terminal pole portion 32 may be pure aluminum; and for a negative electrode terminal, the materials of the pole cap portion 31 and the terminal pole portion 32 may be pure copper.

Figure 5:
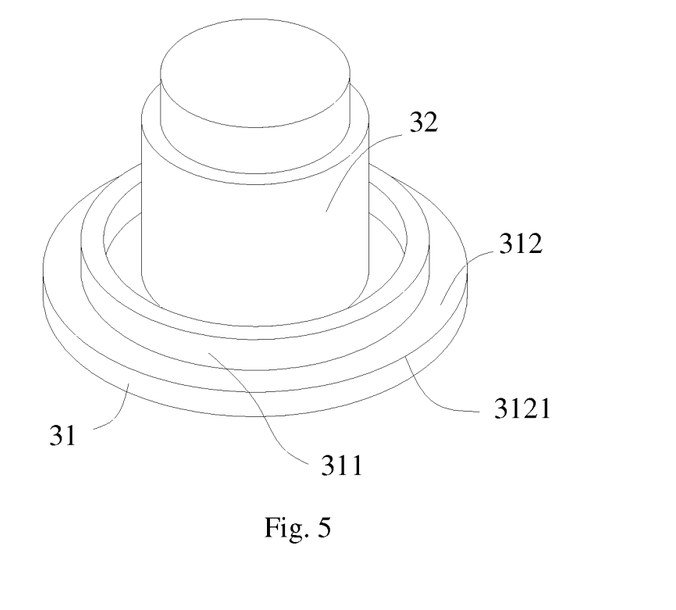
FIG. 5 is a perspective view of an electrode terminal according to an embodiment of the present disclosure.

The terminal pole portion 32 may have a cylindrical shape. In one embodiment, the diameter of the terminal pole portion 32 may be about 9 mm±0.5 mm. The size of other members in the cover assembly, for example, the size of the via hole 11, the electrode receiving hole 21 and a central hole 41, may be determined according to the diameter of the terminal pole portion 32. The pole cap portion 31 may have an outer diameter larger than that of the terminal pole portion 32. The pole cap portion 31 may be further mechanically treated. For example, an edge of a top end surface of the pole cap portion 31 may be chamfered so as to be beneficial for the connection between the pole cap portion 31 and an external load. The terminal pole portion 32 has two ends, i.e., a first end 321 and a second end 322. The pole cap portion 31 is connected with the first end of the terminal pole portion 32. As shown in FIG. 5, the electrode terminal 3 may have a "T" shape. In one embodiment, a buffering structure 311 may be further formed on an inner surface 312 of the pole cap portion 31, i.e., a lower surface of the pole cap portion 31 as shown in FIG. 5, for buffering or reducing the stress produced when the electrode terminal 3 is welded to the ceramic sealing member 4. In one embodiment, the buffering structure 311 may be configured as a support ring formed around the terminal pole portion 32, that is, an annular support boss is formed on the inner surface 312 of the pole cap portion 31. In one embodiment, the outer diameter of the annular support boss is slightly smaller than the outer diameter of the pole cap portion 31. The thickness of the annular support boss may be from about ⅓ to about ¾ of the thickness of a corresponding insulation sealing member to be clamped. The height of the annular support boss may be larger than about ⅓ the height of a corresponding insulation sealing member to be clamped. In one embodiment, for the pole cap portion 31 with an outer diameter of about $8.8^0_{-0.03}$ mm, an annular support boss with a height of about 1.0±0.05 mm, an outer diameter of about 9.2±0.05 mm, an inner diameter of about 8.2±0.05 mm and a thickness of about 1.0±0.05 mm may be formed on the lower surface 312 of the pole cap portion 31, and the annular support boss may be spaced apart from an edge 3121 of the lower surface 312 of the pole cap portion 31 by a distance of about 1.5±0.05 mm. Normally, the annular support boss is not joined with the terminal pole portion 32. The inner diameter of the annular support boss is larger than the outer diameter of the terminal pole portion 32, and a gap is formed between the annular support boss and the terminal pole portion 32. The annular support boss and the pole cap portion 31 may be integrally formed when the pole cap portion 31 is made. Alternatively, the pole cap portion 31 may be formed first, and then the buffering structure 311 is welded on the lower surface of the pole cap portion 31.

In one embodiment, an insulation sealing member 4 is disposed between the electrode terminal 3 and the cover plate connecting member 2 for insulation and sealing. There are no limitations on the insulation sealing member. For example, the insulation sealing member may be an injection molded member. When the insulation sealing member is an injection molded member, the cover assembly according to an embodiment of the present disclosure may prevent the influence of high temperature during the injection molding on the cover plate body 1. In one embodiment, the insulation sealing member may be a ceramic sealing member 4 sandwiched between the electrode terminal 3 and the cover plate connecting member 2, which is hermetically connected with and insulated from the electrode terminal 3 and the cover plate connecting member 2 respectively. As shown in FIGS. 1-3 and 6, in one embodiment, the ceramic sealing member 4 comprises a sealing portion 42 penetrating through the electrode receiving hole 21, and a connecting portion 43 having an outer diameter larger than that of the sealing portion 42 and stationarily connected with the cover plate connecting member 2. In one embodiment, the buffering structure 311 is configured as a support ring, which is supported on an external end surface 431 of the connecting portion 43. In one embodiment, the connecting portion 43 is configured to be disposed in the mounting groove 22 so that it may be connected with the cover plate connecting member 2. The connecting portion 43 may be fastened inside the mounting groove 22, thus further facilitating the welding and enhancing the reliability of the connection. The aperture diameter of the electrode receiving hole 21 is matched with the outer diameter of the sealing portion 42, and is smaller than the outer diameter of the connecting portion 43, so that the cover assembly may have good sealing performance. The connection step may be performed by any technique of connecting a ceramic and a metal which is commonly known in the art, for example, a technique of surface metalizing of a ceramic and welding the ceramic with a metal. For example, a first metal welding layer (not shown in the drawings) is formed between the connecting portion 43 and an inner surface of the bottom portion 223 of the mounting groove 22. In one embodiment, the first metal welding layer is formed by surface-metalizing the connecting portion 43 and welding the connecting portion 43 with the inner surface of the bottom of the mounting groove 22 by soldering. The metalizing may be performed by commonly used ceramic surface metalizing processes in the art, for example, Mn—Mo metalizing a ceramic surface. In one embodiment, after the ceramic metalizing is complete, it is performed to plate nickel, aluminum and other elements which do not affect the welding, so as to enhance the mechanical strength of a welding position and a substrate to be welded. In one embodiment, a transition metal ring is further provided between the connecting portion 43 and the inner surface of the bottom portion 223 of the mounting groove 22 for buffering or reducing the mechanical stress produced during the soldering process. The transition metal ring may be made of various metal materials which may be easily welded with copper, a copper alloy, aluminum or an aluminum alloy, for example, Kovar alloy, pure aluminum or aluminum alloy. The outer diameter of the transition metal ring may be identical with or different from the outer diameter of the connecting portion 43 of the ceramic sealing member 4. In one embodiment, it may be performed to plate nickel, aluminum and other elements which do not affect the welding on the surface of the transition metal ring, so as to enhance the mechanical strength at the welding position and of a substrate to be welded. The soldering process may be performed by any welding processes known in the art, so a detailed description thereof will be omitted here. By the soldering process, a welding joint and the substrate to be welded may be formed into an integral structure. That is, the cover plate connecting member 2 and the ceramic sealing member 4 may be welded into an integral structure. On one hand, the sealing strength may be ensured; on the other hand, the interfacial difference of materials may be reduced, thus reducing the internal resistance of the cover assembly and the heat generated by the battery.

Figure 6:
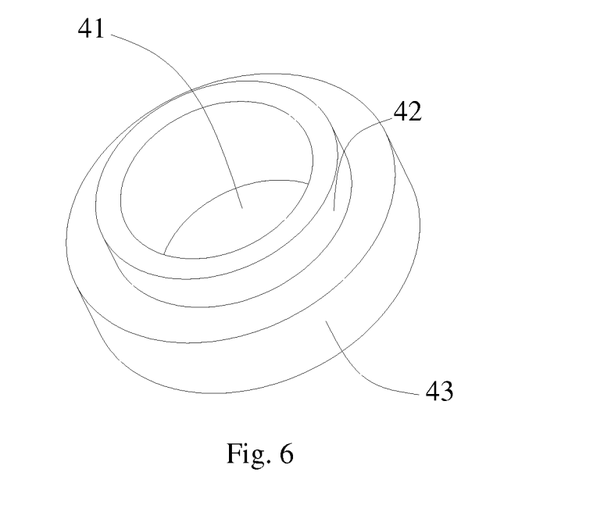
FIG. 6 is a perspective view of a ceramic sealing member according to an embodiment of the present disclosure.

A central hole 41 is formed at the center of the ceramic sealing member 4, and the electrode terminal 3 penetrates through the central hole 41 for leading out a current from inside the battery and is insulated from the cover plate connecting member 2 by the ceramic sealing member 4. In this embodiment, the inner diameter of the central hole 41 in the ceramic sealing member 4 is matched with the outer diameter of the terminal pole portion 32 of the electrode terminal 3. The inner diameter of the central hole 41 in the ceramic sealing member 4 may be slightly larger than the outer diameter of the terminal pole portion 32, to allow a gap to be formed between the central hole 41 and the terminal pole portion 32, so as to avoid the expansion of the ceramic sealing member 4 when heated. The inner diameter of the central hole 41 in the ceramic sealing member 4 may be smaller than the outer diameter of the pole cap portion 31, thus ensuring that the terminal pole portion 32 penetrates through the central hole 41 and the pole cap portion 31 is fastened on the ceramic sealing member 4 and ensuring good sealing performance between the ceramic sealing member 4 and the electrode terminal 3. The pole cap portion 31 is connected with the external end surface of the connecting portion 43 facing thereto. The connection step may be performed by any technique of connecting a ceramic and a metal known in the art, for example, a technique of using a metal soldering flux. For example, a second metal welding layer (not shown in the drawings) is disposed between the pole cap portion 31 and the external end surface of the connecting portion 43. In one embodiment, the second metal welding layer is formed by metalizing the external end surface of the connecting portion 43 and welding the external end surface of the connecting portion 43 with the pole cap portion 31 by a soldering process. The metalizing step may be performed by commonly used ceramic surface metalizing in the art, for example, Mn—Mo metalizing a ceramic surface. In one embodiment, after the ceramic metalizing is complete, it is performed to plate nickel, aluminum and other elements which may not affect the welding, so as to enhance the mechanical strength of a welding position and a substrate to be welded. In one embodiment, a transition metal ring is further disposed between the pole cap portion 31 and the external end surface of the connecting portion 43 for buffering or reducing the mechanical stress produced during the soldering process. The transition metal ring may be made of various metal materials which may be easily welded with copper, a copper alloy, aluminum or an aluminum alloy, for example, Kovar alloy, copper, a copper alloy, pure aluminum or an aluminum alloy. The outer diameter of the transition metal ring may be identical with or different from the outer diameter of the connecting portion 43 of the ceramic sealing member 4. In one embodiment, it may be performed to plate nickel, aluminum and other elements which may not affect the welding on the surface of the transition metal ring, so as to enhance the mechanical strength of a welding position and a substrate to be welded. The soldering process may be performed by welding techniques commonly used by those skilled in the art, so a detailed description thereof will be omitted here for clarity purpose. By the soldering process, a welding joint and a substrate to be welded may be formed into an integral structure, that is, the cover plate connecting member 2 and the ceramic sealing member 4 are welded into an integral structure. On one hand, the sealing strength may be ensured; on the other hand, the interfacial difference of materials may be reduced, thus reducing the internal resistance of the cover assembly and the heat generated by the battery.

In some embodiments, the ceramic sealing member 4 may be one of an aluminum oxide ceramic ring, a zirconium oxide ceramic ring, an aluminum nitride ceramic ring, a boron nitride ceramic ring, a silicon nitride ceramic ring, and a composite ceramic ring of aluminum oxide and zirconium oxide. In one embodiment, the ceramic sealing member 4 may be a composite ceramic ring of aluminum oxide and zirconium oxide, the central hole 41 in the ceramic sealing member 4 has an aperture diameter of about 06.2±0.1 mm and a thickness of about 2.5±0.1 mm. The ceramic sealing member 4 has good corrosion resistance without being corroded by the electrolyte, thus ensuring the service life of the lithium ion battery. The impact strength and the thermal shock resistance of the ceramic sealing member 4 may be superior to those made of glass, so that the structure of the cover assembly may be more stable and the sealing effect may be better. It should be noted that, when the ceramic sealing member 4, rather than a ceramic plate, is used as a sealing and connection medium, the ceramic sealing member 4 has a larger thickness, thus the thermal shock resistance and the thermal cycling performance of the lithium ion battery may be improved.

In this embodiment, the terminal pole portion 32 penetrates through the central hole 41 of the ceramic sealing member 4, and the second end 322 of the terminal pole portion 32 extends out of the ceramic sealing member 4 for electrical conduction with the electric core in the shell. In one embodiment, an electrode connecting piece 5 is connected with the second end of the terminal pole portion 32 which is extended out of the ceramic sealing member 4 (as shown in FIG. 3), and, in one embodiment, the electrode connecting piece 5 may be welded with a tab of the electric core (not shown) for leading out the current from inside the battery.

In order to prevent electrical short circuit, an insulation treatment may be performed between the cover plate body 1 and the electrode connecting piece 5 or between the cover plate connecting member 2 and the electrode connecting piece 5. For example, a sealing member 6, for example, a sealing ring, may be provided between the cover plate body 1 and the electrode connecting piece 5 or between the cover plate connecting member 2 and the electrode connecting piece 5. In this embodiment, particularly, an O-ring 6 may be fitter over a second end 44 of the ceramic sealing member 4. The sealing ring 6 may be made of a material which is not soluble in the electrolyte, for example, a PP (polypropylene) or PE (polyethylene) plastic.

The method of manufacturing the cover assembly according to an embodiment of the present disclosure comprises the following steps.

The connecting portion 43 of the ceramic sealing member 4 is surface metallized (Step S1).

Then, the cover plate connecting member 2 is fitted over the sealing portion 42 of the ceramic sealing member 4 (Step S2).

In this step, the metal cover plate connecting member 2 is welded with the ceramic sealing member 4 by a soldering or fusion-cast process. For the soldering process, a soldering flux may be used at a temperature not lower than a melting point of a parent metal to perform the welding. For the fusion-cast process, only the parent metal needs to be melted to achieve the connection between the metal and the ceramic. The step and parameters of the fusion-cast process are known in the art. In some embodiments, a solder used in the soldering process may be one for welding a ceramic with aluminum, for example, an Al—Si alloy, an Al—Mg alloy, or an Al—Si—Mg alloy. In one embodiment, the solder used in the soldering process may be an Al—Si alloy, in which the content of Si is in a range from 0 to about 12 wt %, and preferably, in a range from 5 wt % to about 8 wt %, and the balance is Al. The soldering process is performed at a temperature of about 570° C. to about 625° C. under vacuum or an inert gas atmosphere. In one embodiment, the inert gas atmosphere may be a nitrogen atmosphere or a mixed gas atmosphere of nitrogen and hydrogen. In one embodiment, the fusion-cast process may be performed at a temperature of about 600° C. to about 1300° C. under vacuum or an inert gas atmosphere.

The terminal pole portion 32 of the electrode terminal 3 is fitted in the central hole 41 of the ceramic sealing member 4 connected with the cover plate connecting member, the second end 322 of the terminal pole portion extends out of the central hole 41, and the pole cap portion 31 of the electrode terminal 3 is welded with the external end surface of the connecting portion 43 of the ceramic sealing member 4 (Step S3).

In this step, the metal pole cap portion 31 is welded with the connecting portion 43 of the ceramic sealing member 4 by a soldering or fusion-cast process. For the soldering process, a soldering flux and a solder need to be used at a temperature not lower than a melting point of a parent metal to perform the welding. For the fusion-cast process, only the parent metal needs to be melted to achieve the connection between the metal and the ceramic. The step and parameters of the fusion-cast process are well known in the art. In some embodiments, a solder used in the soldering process may be a solder for welding a ceramic with aluminum, for example, an Al—Si alloy, an Al—Mg alloy, or an Al—Si—Mg alloy. In one embodiment, the solder used in the soldering process may be an Al—Si alloy, in which the content of Si is in a range from 0 to about 12 wt %, preferably, in a range from 5 wt % to about 8 wt %, and the balance is Al, so that the welding effect may be better. The soldering process is performed at a temperature of about 570° C. to about 625° C. under vacuum or an inert gas atmosphere. In one embodiment, the inert gas atmosphere may be a nitrogen atmosphere or a mixed gas atmosphere of nitrogen and hydrogen. In one embodiment, the fusion-cast process may be performed at a temperature of about 600° C. to about 1300° C. under vacuum or an inert gas atmosphere.

An O-ring 6 is fitted over outer surfaces of portions of the ceramic sealing member 4 and the terminal pole portion 32 which are extended out of the electrode receiving hole 21 after penetrating through the electrode receiving hole 21, and then the sheet-like electrode connecting piece 5 is welded with the second end 322 of the terminal pole portion 32 which is extended out of the central hole 41 (Step S4). The welding step may be performed by a physical welding process. For example, the physical welding process may be resistance welding, laser welding or ultrasonic welding, for achieving the welding between different metals. The steps and parameters of the resistance welding, laser welding or ultrasonic welding process are well known to those skilled in the art, so a detailed description thereof will be omitted here for clarity purpose.

An integral structure of the electrode terminal 3, the ceramic sealing member 4 and the cover plate connecting member 2 is placed in the via hole 11 of the cover plate body 1, the flanging portion 221 of the cover plate connecting member 2 laps over the step portion 111 of the stepped hole, and then the flanging portion 221 is welded with the cover plate body 1 to make the cover assembly into an integral structure (Step S5). The welding step may be performed by a physical welding processes. For example, the physical welding processes may be resistance welding, laser welding or ultrasonic welding, for achieving the welding between different metals. The steps and parameters of the resistance welding, laser welding or ultrasonic welding process are well known to those skilled in the art, so a detailed description thereof will be omitted here for clarity purpose.

In the above method, one cover plate body 1 may be formed with one electrode terminal 3, and may also be formed with a plurality of electrode terminals 3 with different polarities. The sequence of the steps of the above manufacturing method may be adjusted according to the mounting mode and the welding temperature. When the electrode terminal is a negative electrode terminal, the cover assembly may be manufactured directly in accordance with the above steps. When the electrode terminal is a positive electrode terminal, the steps S2, S3, S4 and S5 may be recombined, that is, the electrode terminal 3, the ceramic sealing member 4 and the cover plate body 1 are assembled according to the positional relationship thereof and then welded together. For example, when there are positive and negative electrode terminals, the ceramic sealing member 4 and an electrode terminal 3 with one polarity, for example, a negative electrode terminal, are first made into an integral structure in accordance with the steps S1, S2, S3, and then the integral structure and the cover plate body 1 are assembled. Then, the surface of the ceramic sealing member is metallized in accordance with the step S1, and the ceramic sealing member 4, the cover plate body 1 and an electrode terminal 3 with the other polarity, for example, a positive electrode terminal, are assembled. Then, the positive electrode terminal and the negative electrode terminal are welded in accordance with the step S3 respectively. Finally, subsequent steps are carried out accordingly.

According to an embodiment of the present disclosure, a battery is provided. The battery comprises: a shell having at least an opening end, the cover assembly described above for sealing the opening end, and an electric core and an electrolyte which are received in a sealed space formed by the shell and the cover assembly, in which the electrode terminal is electrically connected with the electric core. In the following, further embodiments of the battery, such as a lithium ion battery, will be illustrated for the better understanding of the gist and essence of the present disclosure.

In one embodiment, when the shell has one opening end, the electric core is placed in the shell, the electrolyte is injected into the shell, and then the cover assembly formed with two electrode terminals 3 is mounted onto the opening end of the shell. In this process, the periphery of the cover assembly is welded with the shell, and the electrode connecting piece of the cover assembly is connected with the electric core. Particularly, a positive plate of the electric core is connected with the electrode connecting piece on one electrode terminal via a positive tab, a negative plate of the electric core is connected with the electrode connecting piece on the other electrode terminal via a negative tab. After the assembling, a sealed space is formed between the cover assembly and the shell, and the electric core and the electrolyte are received in the sealed space. The two electrode terminals are used as two electrodes of the lithium ion battery respectively, and may be connected with external electrical apparatuses respectively.

In one embodiment, the shell may have two opening ends and is formed with two cover assemblies, one cover assembly is formed with a positive electrode terminal, and the other cover assembly is formed with a negative electrode terminal. At this time, two cover assemblies are mounted onto the two opening ends of the shell respectively. In this process, the peripheries of the two cover assemblies are welded with the shell respectively, and the electrode connecting pieces of the two cover assemblies are connected with the electric core respectively. Particularly, a positive plate of the electric core is connected with the terminal pole portion of the cover assembly formed with the positive electrode terminal via a positive tab, a negative plate of the electric core is connected with the terminal pole portion of the cover assembly formed with the negative electrode terminal via a negative tab. After the assembling, a sealed space is formed among the two cover assemblies and the shell, and the electric core and the electrolyte are received in the sealed space. The terminal pole portions of the two cover assemblies are used as two electrodes of the lithium ion battery respectively, and may be connected with external electrical apparatuses respectively.

With the cover assembly according to an embodiment of the present disclosure, after the electrode terminal is hermetically connected with and insulated from the cover plate connecting member, the electrode terminal is connected with the cover plate body via the cover plate connecting member. Because the cover plate connecting member may be a small member, during the high-temperature welding between the cover plate connecting member and the ceramic sealing member, the cover plate connecting member may be difficult to deform, and the cover plate connecting member may be washed after sintered, which may be convenient and easily achieved. Then, the cover plate connecting member is welded with the cover plate body, thus improving the battery performance accordingly. The main function of the cover plate connecting member is to hermetically connect the ceramic sealing member, the electrode terminal and the cover plate body together, so there are no limitations on the shape of the cover plate connecting member. Moreover, the cover plate connecting member may have a small bulk. Furthermore, the cover plate connecting member may sustain a high temperature. Therefore, at a high temperature, the deformation of the cover plate connecting member may be small, which may not affect the sealing of the battery; and the cover plate connecting member made of a material identical to that of the cover plate body is welded with the cover plate body, which may be easily achieved without influence on the strength of the cover plate body. With the cover assembly according to an embodiment of the present disclosure, the manufacturing cost may be reduced, especially the battery yield is increased, the battery safety is enhanced, the connection of the structure of the cover assembly is stable, and the cover assembly has good sealing performance, thus laying a sound foundation for practical application and development of a battery which is ceramic sealed.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. A cover assembly, comprising:
    a cover plate body formed with at least one via hole penetrating therethrough;
    a cover plate connecting member disposed in a via hole of the cover plate body and hermetically connected with the cover plate body at the via hole, wherein the cover plate connecting member includes:
      an electrode receiving hole, and
      a mounting groove with the electrode receiving hole penetrating through a bottom of the mounting groove;
    an electrode terminal penetrating through the electrode receiving hole to be hermetically connected with and insulated from the cover plate connecting member for leading out a current; and
    an insulation sealing member between the electrode terminal and the cover plate connecting member and spaced apart from the cover plate body by the cover plate connecting member, wherein the electrode terminal and the insulation sealing member are mounted onto the mounting groove.

2. The cover assembly according to claim 1, wherein the cover plate connecting member comprises:
    a flanging portion formed at a periphery of the mounting groove, which is connected with the cover plate body.

3. The cover assembly according to claim 2, wherein the via hole is configured as a stepped hole, and the flanging portion is disposed on a step portion of the stepped hole and connected with the cover plate body.

4. The cover assembly according to claim 1, wherein the insulation sealing member is a ceramic sealing member between the electrode terminal and the cover plate connecting member, and is hermetically connected with and insulated from the electrode terminal and the cover plate connecting member respectively.

5. The cover assembly according to claim 4, wherein a central hole is formed at the center of the ceramic sealing member, and the electrode terminal penetrates through the central hole.

6. The cover assembly according to claim 5, wherein the ceramic sealing member comprises:
    a sealing portion penetrating through the electrode receiving hole; and
    a connecting portion having an outer diameter larger than that of the sealing portion and connected with the cover plate connecting member.

7. The cover assembly according to claim 6, wherein the cover plate connecting member comprises:
    a flanging portion formed at a periphery of the mounting groove, which is connected with the cover plate body.

8. The cover assembly according to claim 7, wherein
    a first metal welding layer is formed between the connecting portion and an inner surface of the bottom of the mounting groove, and
    the first metal welding layer is formed by surface metallizing the connecting portion and welding the connecting portion with the inner surface of the bottom of the mounting groove.

9. The cover assembly according to claim 8, wherein a transition metal ring is further provided between the connecting portion and the inner surface of the bottom of the mounting groove.

10. The cover assembly according to claim 9, wherein the transition metal ring is made of a nickel-cobalt ferrous alloy.

11. The cover assembly according to claim 5, wherein the electrode terminal comprises:
    a terminal pole portion; and
    a pole cap portion connected with an end of the terminal pole portion, wherein the terminal pole portion penetrates through the central hole in the ceramic sealing member, and the other end of the terminal pole portion extends out of the ceramic sealing member.

12. The cover assembly according to claim 11, wherein the ceramic sealing member comprises:
   a sealing portion penetrating through the electrode receiving hole; and
   a connecting portion having an outer diameter larger than that of the sealing portion, which is connected with the cover plate connecting member,
   wherein the pole cap portion is connected with an external end surface of the connecting portion facing thereto.

13. The cover assembly according to claim 12, wherein a second metal welding layer is disposed between the pole cap portion and the external end surface of the connecting portion, and the second metal welding layer is formed by metallizing the external end surface of the connecting portion and welding the external end surface of the connecting portion with the pole cap portion.

14. The cover assembly according to claim 12, wherein a transition metal ring is further disposed between the pole cap portion and the external end surface of the connecting portion.

15. The cover assembly according to claim 12, wherein the pole cap portion is further formed with a buffering structure, which is disposed on the external end surface of the connecting portion.

16. The cover assembly according to claim 15, wherein the buffering structure is configured as a support ring, which is supported on the external end surface of the connecting portion.

17. The cover assembly according to claim 11, wherein an electrode connecting piece is connected with the other end of the terminal pole portion, which is extended out of the ceramic sealing member, and a sealing member is disposed between the cover plate connecting member and the electrode connecting piece.

18. The cover assembly according to claim 1, wherein there are a plurality of electrode terminals, and a plurality of electrode receiving holes corresponding to the electrode terminals are formed in the cover plate connecting member.

19. The cover assembly according to claim 1, wherein a plurality of via holes are formed in the cover plate body, and there are a plurality of cover plate connecting members each hermetically connected with the cover plate body at a corresponding via hole.

20. A battery, comprising:
   a shell having at least an opening end;
   a cover assembly, comprising:
      a cover plate body formed with at least one via hole penetrating therethrough;
      a cover plate connecting member disposed in a via hole of the cover plate body and is hermetically connected with the cover plate body at the via hole, wherein the cover plate connecting member includes:
         an electrode receiving hole, and
         a mounting groove with the electrode receiving hole penetrating through a bottom of the mounting groove;
      an electrode terminal penetrating through the electrode receiving hole to be hermetically connected with and insulated from the cover plate connecting member for leading out a current; and
      an insulation sealing member between the electrode terminal and the cover plate connecting member and spaced apart from the cover plate body by the cover plate connecting member, wherein the electrode terminal and the insulation sealing member are mounted onto the mounting groove; and
   an electric core and an electrolyte which are received in a sealed space formed by the shell and the cover assembly, wherein the electrode terminal is electrically connected with the electric core.

* * * * *